(12) United States Patent
Miyazawa et al.

(10) Patent No.: US 10,145,046 B2
(45) Date of Patent: Dec. 4, 2018

(54) SHEET MANUFACTURING APPARATUS

(71) Applicant: SEIKO EPSON CORPORATION, Tokyo (JP)

(72) Inventors: Kazuma Miyazawa, Nagano (JP); Shigeo Fujita, Nagano (JP)

(73) Assignee: Seiko Epson Corporation, Tokyo (JP)

(*) Notice: Subject to any disclaimer, the term of this patent is extended or adjusted under 35 U.S.C. 154(b) by 11 days.

(21) Appl. No.: 15/101,278

(22) PCT Filed: Aug. 28, 2014

(86) PCT No.: PCT/JP2014/004435
§ 371 (c)(1),
(2) Date: Jun. 2, 2016

(87) PCT Pub. No.: WO2015/097944
PCT Pub. Date: Jul. 2, 2015

(65) Prior Publication Data
US 2017/0037550 A1 Feb. 9, 2017

(30) Foreign Application Priority Data
Dec. 25, 2013 (JP) ................................. 2013-266610

(51) Int. Cl.
*D04H 1/26* (2012.01)
*D04H 1/732* (2012.01)
(Continued)

(52) U.S. Cl.
CPC ............ *D04H 1/732* (2013.01); *B32B 5/26* (2013.01); *D04H 1/26* (2013.01); *D21B 1/32* (2013.01);
(Continued)

(58) Field of Classification Search
CPC ...... D04H 1/732; D04H 1/26; D10B 2201/01; D21F 9/00; D21B 1/06
(Continued)

(56) References Cited

U.S. PATENT DOCUMENTS 3,010,161 A 11/1961 Duvall
3,201,499 A 8/1965 Casse
(Continued)

FOREIGN PATENT DOCUMENTS

GB 1375584 A 11/1974
JP 2003-520912 A 7/2003
(Continued)

OTHER PUBLICATIONS

The Extended European Search Report for the corresponding European Application No. 14874594.6 dated May 24, 2017.

*Primary Examiner* — Mark Halpern (57) ABSTRACT

Discharge of fiber and other particulate to the outside of a housing unit is prevented.
A drum unit in which material including at least fiber passes through apertures; a conveyance unit configured to deposit the airborne material that past the drum unit as a web and convey the web; a housing unit configured to cover the drum unit, contact the web on the downstream side in the conveyance direction of the web, and contact the conveyance unit on the upstream side in the conveyance direction of the web from the downstream contact position; and a forming unit that forms a sheet using the web.

6 Claims, 4 Drawing Sheets

(51) Int. Cl.
  *B32B 5/26* (2006.01)
  *D21B 1/32* (2006.01)
  *D21F 9/02* (2006.01)

(52) U.S. Cl.
  CPC ............ *D21F 9/02* (2013.01); *D10B 2201/01* (2013.01); *Y02W 30/646* (2015.05)

(58) Field of Classification Search
  USPC .......................................................... 162/200
  See application file for complete search history.

(56) References Cited

U.S. PATENT DOCUMENTS

| | | | |
|---|---|---|---|
| 4,352,649 A * | 10/1982 | Jacobsen | ................ D04H 1/732 19/296 |
| 4,353,649 A | 10/1982 | Jacobsen et al. | |
| 5,515,619 A | 5/1996 | Kahl et al. | |
| 8,882,965 B2 | 11/2014 | Yamagami et al. | |
| 9,194,081 B2 | 11/2015 | Yamagami | |
| 2004/0242108 A1 | 12/2004 | Russell et al. | |
| 2016/0305066 A1* | 10/2016 | Miyazawa | ................ D21B 1/06 |

FOREIGN PATENT DOCUMENTS

| | | |
|---|---|---|
| JP | 2012-144819 A | 8/2012 |
| WO | 01/54873 A1 | 8/2001 |

* cited by examiner

SHEET MANUFACTURING APPARATUS

This application is a 371 of PCT/JP2014/004435 filed 28 Aug. 2014.

TECHNICAL FIELD

The present invention relates to a sheet manufacturing apparatus.

BACKGROUND

A paper recycling system having a dry defibrating unit that shreds and defibrates paper, a first conveyance unit that conveys the defibrated material output by the dry defibrating unit, an air classifier that separates and de-inks the defibrated material conveyed by the first conveyance unit, a second conveyance unit that conveys the defibrated material de-inked by the classifier, and a paper-forming unit that produces paper from the defibrated material conveyed by the second conveyance unit is known from the literature. The paper-forming unit is configured with a forming drum having a foraminous screen, and discharges the fibers through the foraminous screen and deposits the discharged fibers onto the mesh belt by rotationally driving the forming drum. (See, for example, PTL 1.)

CITATION LIST

Patent Literature

[PTL 1] JP-A-2012-144819

SUMMARY OF INVENTION

Technical Problem

While the paper recycling system described above has a housing unit covering the forming drum of the paper-forming unit, the construction of the housing unit is not described. More particularly, a configuration that prevents fiber or other particulate from spreading from between the housing unit and the mesh belt is desirable.

Solution to Problem

The present invention is directed to solving at least part of the foregoing problem, and can be achieved by the embodiments or examples described below.

EXAMPLE 1

A sheet manufacturing apparatus according to this example is characterized by having a drum unit in which material including at least fiber passes through apertures; a conveyance unit configured to deposit the airborne material that past the drum unit as a web and convey the web; a housing unit configured to cover the drum unit, contact the web on the downstream side in the conveyance direction of the web, and contact the conveyance unit on the upstream side in the conveyance direction of the web from the downstream contact position; and a forming unit that forms a sheet using the web.

Thus comprised, material that passed from apertures in the drum unit are deposited on the conveyance unit as a web and conveyed. A housing unit covering the drum unit contacts the accumulated web on the downstream side in the conveyance direction of the web. In addition, the housing unit contacts the conveyance unit upstream in the conveyance direction of the web from the part that contacts the web on the downstream side in the conveyance direction of the web. Because the web is not deposited on the upstream side in the conveyance direction of the web, material spreading outside the housing unit is suppressed by the housing unit touching the conveyance unit. Furthermore, because the web accumulates on the downstream side in the conveyance direction of the web, the deposited web cannot pass if the housing unit contacts the conveyance unit. However, by the housing unit touching the web, the web can pass while the material that past the drum unit is suppressed from spreading outside of the housing unit. Material that past the drum unit therefore stays in the housing unit, and material can be suppressed from spreading outside the housing unit.

EXAMPLE 2

The sheet manufacturing apparatus described in the foregoing example, characterized by the housing unit having a roller that contacts the web on the downstream side in the conveyance direction of the web.

Thus comprised, a roller is provided on the downstream side of the housing unit in the conveyance direction of the web, and the roller contacts the deposited web. Material leaking to the outside of the housing unit can therefore be suppressed, and web conveyance can be improved. Furthermore, because a roller surface contacts the web, the web can be conveyed without breaking up the deposited part of the web, and without damaging the surface of the web.

EXAMPLE 3

The sheet manufacturing apparatus described in a foregoing example, characterized by having a drive unit that drives the roller.

Thus comprised, the web can be easily pulled in the conveyance direction and reliably conveyed.

EXAMPLE 4

The roller of the sheet manufacturing apparatus described in a foregoing example characterized by being able to move, and having an urging member that urges the roller.

Thus comprised, because the roller is movable and is urged, its position can change according to the thickness of the deposited web, and the web can be conveyed without breaking up even if webs of different thicknesses are conveyed.

EXAMPLE 5

The sheet manufacturing apparatus described in a foregoing example, characterized by the housing unit having a pile seal on the upstream side in the conveyance direction of the web.

Thus comprised, the conveyance unit can be driven without interference with the operation of the conveyance unit because the pile seal of the housing unit contacts the conveyance unit. Because the conveyance unit therefore does not wear easily, durability is excellent. Fiber and other material leaking to the outside of the housing unit can also be reduced even without an airtight fit.

EXAMPLE 6

The sheet manufacturing apparatus described in a foregoing example, characterized by the housing unit having a pile seal on the downstream side in the conveyance direction of the web, and the pile seal contacting the roller.

Thus comprised, by using a pile seal, there is little wear when in contact with a rotating roller. The gap between the roller and the housing unit can also be closed, and fiber and other material leaking to the outside of the housing unit can also be reduced even without an airtight fit.

DESCRIPTION OF EMBODIMENTS

A preferred embodiment of the invention is described below with reference to the accompanying figures. Note that parts are shown in the accompanying figures in sizes enabling easy recognition thereof, and differ from the actual scale of the actual parts.

The configuration of the sheet manufacturing apparatus is described first below. The sheet manufacturing apparatus is based on technology for forming a new sheet Pr from feedstock Pu (material to be defibrated) such as virgin pulp paper and recovered paper. The sheet manufacturing apparatus has a drum unit in which material including at least fiber passes through apertures; a conveyance unit that deposits airborne material that past the drum unit as a web and conveys the web; a housing unit that covers the drum unit, contacts the web on the downstream side in the conveyance direction of the web, and contacts the conveyance unit upstream in the conveyance direction of the web from where the housing unit contacts the web on the downstream side; and a forming unit that forms a sheet using the web. The configuration of the sheet manufacturing apparatus is further described below.

Figure 1:
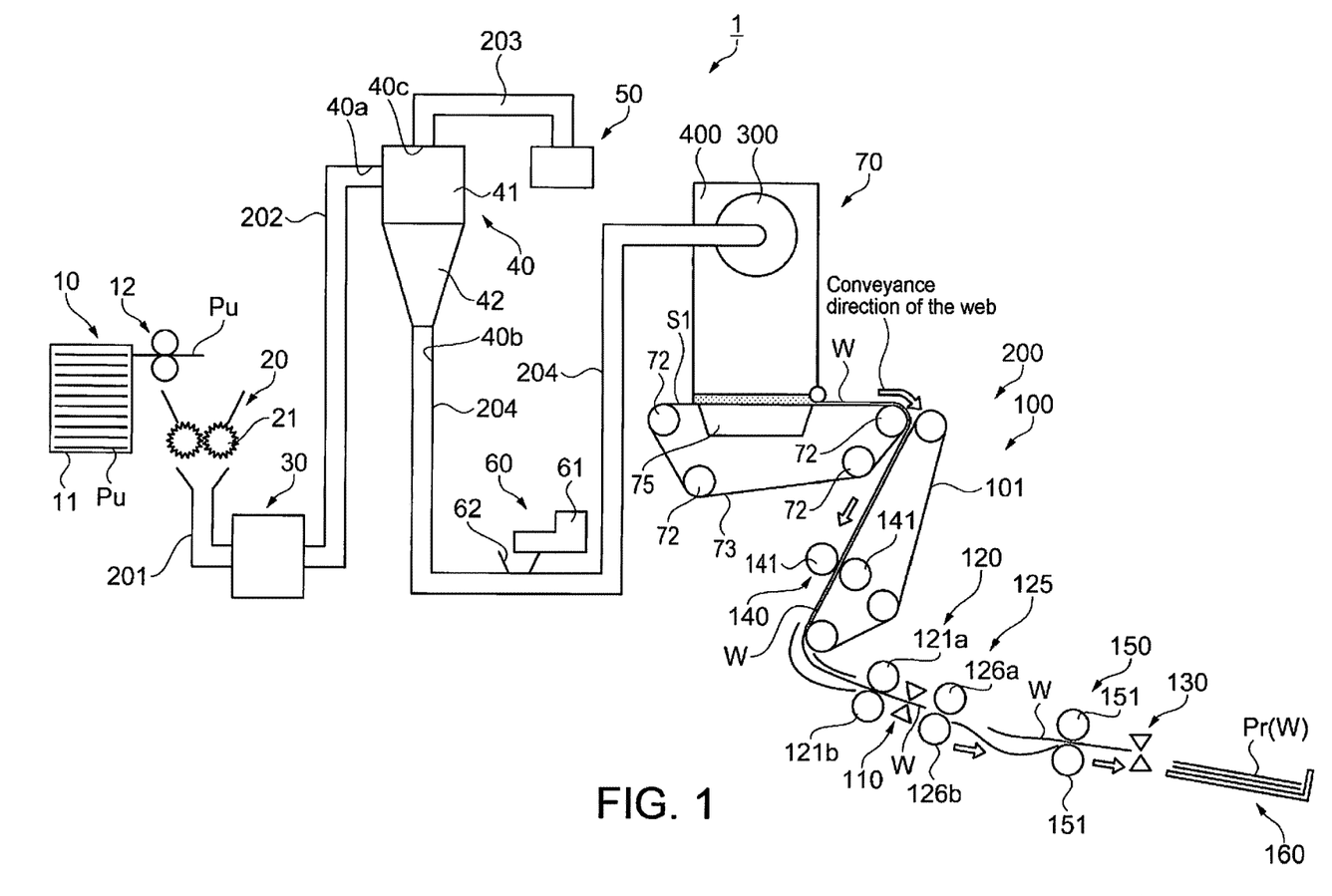
FIG. 1 schematically illustrates the configuration of a sheet manufacturing apparatus according to the invention.

FIG. 1 schematically illustrates the configuration of the sheet manufacturing apparatus according to this embodiment of the invention. As shown in FIG. 1, the sheet manufacturing apparatus 1 according to this embodiment has a supply unit 10, a shredder 20, a defibrating unit 30, a classifier 40, a receiver 50, an additive agent feed unit 60, a distributor unit 70, a conveyance unit 100, a cutting unit 110, and a forming unit 200. The sheet manufacturing apparatus 1 also has a control unit that controls these other parts.

The supply unit 10 supplies recovered paper Pu to the shredder 20. The supply unit 10 includes a tray 11 for stocking a stack of sheets of recovered paper Pu, and an automatic sheet feeder 12 for continuously supplying the recovered paper Pu in the tray 11 to the shredder 20. A4 office paper such as typically used in business is an example of the recovered paper Pu that is supplied to the sheet manufacturing apparatus 1.

The shredder 20 cuts the supplied recovered paper Pu into pieces a few centimeter square. The shredder 20 has shredder blades 21, and is configured similarly to a common office shredder but with a wider shredding width. This enables easily cutting the recovered paper Pu that is supplied into pieces of a suitable size. The shredded paper is then conveyed through a pipe 201 to the defibrating unit 30.

The defibrating unit 30 has rotary blades that turn (not shown in the figure), and defibrates and separates the shredded paper supplied from the shredder 20 into fibers. Note that the defibrating unit 30 in this embodiment of the invention defibrates the shredded paper in air in a dry process. As a result of the defibration process of the defibrating unit 30, ink and toner used for printing, sizing agents, and other coating materials applied to the paper are reduced to particulate several ten microns or less in diameter (referred to below as "ink particles"), and separated from the fibers. The defibrated material output from the defibrating unit 30 is thus the fibers and ink particles obtained by defibration of the shredded paper. The defibrating unit 30 also produces an air current by rotation of the rotary blades, and the defibrated fiber is conveyed by this air current through a pipe 202 to the classifier 40. If a dry defibrating unit 30 without an air blower mechanism is used, a separate blower that produces an air flow from the shredder 20 to the defibrating unit 30 may be added.

The classifier 40 separates defibrated material into ink particles and fibers. This embodiment of the invention uses a cyclone unit as the classifier 40 (described below as a cyclone 40 as the classifier), and separates the conveyed fiber into ink particles and de-inked fibers (de-inked defibrated material) by an air separation process. Note that an air classifier other than a cyclone 40 separator may be used. In this event, an elbow-jet or eddy classifier, for example, may be used as an air classifier instead of a cyclone 40. An air classifier produces a helical air flow, and separates and classifies by means of the differences in centrifugal force resulting from the size and density of the defibrated material, and the cut point can be adjusted by adjusting the speed of the air flow and the centrifugal force. As a result, relatively small, relatively low density ink particles can be separated from the fibers that are larger and more dense than the ink particles. Removing the ink particles from the fibers is referred to as "de-inking."

The tangential inlet cyclone of the cyclone 40 has a relatively simple construction. The cyclone 40 in this embodiment of the invention has an inlet port 90a from the defibrating unit 30; a cylindrical cyclone body 41 to which the inlet port 40a is tangentially attached; a conical section 42 continuing from the bottom of the cyclone body 41; a lower discharge port 40b disposed to the bottom of the conical section 42; and an upper discharge port 40c disposed to the top center of the cyclone body 41 for discharging fine particulate. The diameter of the conical section 42 decreases from top to bottom.

In the separation process, the air flow carrying the defibrated material introduced from the inlet port 40a of the cyclone 40 is converted by the cyclone body 41 to a circular motion, causing the fibers to interlock and grow in mass due to centrifugal force and the air flow, and move to the conical section 42. The separated ink particles rise as fine particulate with air to the upper discharge port 40c, and de-inking progresses. A short fiber mixture containing a large amount of ink particles is then discharged from the upper discharge port 40c of the cyclone 40. The discharged short fiber mixture containing a large amount of ink particles is then recovered through a pipe 203 connected to the upper discharge port 40c of the cyclone 40 into the receiver 50. The de-inked fiber is conveyed through a pipe 204 from the lower discharge port 40b of the cyclone 40 to the distributor unit 70. Note that a suction unit for efficiently suctioning the short fiber mixture from the upper discharge port 40c may also be disposed to the upper discharge port 40c or pipe 203, for example.

An additive agent feed unit 60 for adding an additive such as a resin (a fusion bonding resin or thermosetting resin, for example) to the conveyed defibrated fibers is also disposed to the pipe 204 through which the de-inked fiber is conveyed from the cyclone 40 to the distributor unit 70. In addition to fusion bonding resin, additives such as flame retardants, bleaching agents, paper strengtheners, and sizing agents may also be added. These additives are stored in an additive hopper 61 and introduced through a loading port 62 by a loader mechanism not shown.

The distributor unit 70 disperses material containing at least fiber into air. The distributor unit 70 in this embodiment of the invention has a mechanism for dispersing by means of a rotating motion the material containing fiber and resin that is delivered from the pipe 204. The distributor unit 70 in this embodiment of the invention has a drum unit 300 that passes material including at least fiber through numerous apertures, and a housing 400 that covers the drum unit 300.

An endless mesh belt 73 (part of the conveyance unit 100) made with mesh and tensioned by tension rollers 72 (four tension rollers 72 in this embodiment of the invention) is disposed below the distributor unit 70. The mesh belt 73 moves in one direction by at least one of the tension rollers 72 turning.

A suction device 75 that produces a downward flow of air through the mesh belt 73 is disposed as a suction unit below the drum unit 300 with the mesh belt 73 therebetween. The suction device 75 pulls the fibers suspended in air inside the distributor unit 70 down onto the mesh belt 73.

In this configuration, material that past through the drum unit 300 is deposited onto the mesh belt 73 by the suction power of the suction device 75. By moving the mesh belt 73 in one direction, the fibers and resin can be deposited to form a continuous web W. A single continuous web W can be formed by continuously dispersing material in the distributor unit 70 and moving the mesh belt 73. Note that the mesh belt 73 may be made of metal, plastic, or nonwoven cloth, and may be configured in any way enabling fibers to build up on and air to pass through the mesh belt 73. Note that if the size of the mesh in the mesh belt 73 is too large, fibers may enter the mesh and create irregularities in the formed web W (sheet), and if the mesh is too small, it is difficult for the suction device 75 to maintain a stable air flow. As a result, the size of the mesh is preferably adjusted appropriately. The suction device 75 can be constructed by forming an air-tight box with a window of a desirable size below the mesh belt 73, and pulling air in through the window so that the pressure inside the box is lower than the ambient pressure. Note that a web W according to this embodiment of the invention refers to the configuration of an object containing fibers and resin. The web W is therefore still referred to as a web even if the size or other aspect of its form changes by heating, compressing, cutting, conveying or other manipulation of the web W.

The web W formed on the mesh belt 73 is conveyed by the conveyance unit 100. The conveyance unit 100 in this embodiment of the invention illustrates the conveyance process of the web W from the mesh belt 73 to final deposition as a sheet Pr (web W) in the stacker 160. In addition to the mesh belt 73, the conveyor belt mechanism 101 described below and various rollers function as part of the conveyance unit 100. The conveyance unit many be variously configured with at least one conveyor belt or conveyance roller. More specifically, the web W formed on the mesh belt 73, which is part of the conveyance unit 100, is first conveyed in the conveyance direction (indicated by the arrow in the figures) by rotation of the mesh belt 73.

Next, the web W is passed from the mesh belt 73 to the conveyor belt mechanism 101, and is conveyed in the conveyance direction (direction of the arrow in the figure). Note that a forming unit 200 that uses the web W to form a sheet Pr is included in the conveyance unit 100 in this embodiment of the invention.

A compression unit is disposed on the downstream side of the distributor unit 70 in the conveyance direction of the web W. The compression unit in this embodiment of the invention is a compression unit 140 comprising a pair of rollers 141 that apply pressure to the web W. The web W can be compressed by passing the web W between the pair of rollers 141. As a result, the strength of the web W can be improved.

A pre-cutter roller 120 is disposed on the downstream side of the compression unit 140 in the conveyance direction of the web W. The pre-cutter roller 120 comprises a pair of rollers 121*a* and 121*b*. Of the rollers 121*a* and 121*b*, one is the drive roller and the other is a driven roller.

A one-way clutch is used in the drive transfer unit that turns the pre-cutter roller 120. A one-way clutch has a clutch mechanism that transfers torque in only one direction, and rotates freely in the opposite direction. As a result, because the pre-cutter roller 120 rotates freely when excessive tension is applied to the web W by the speed difference between the pre-cutter roller 120 and the post-cutter roller 125, tension on the web W is suppressed, and the web W being torn can be prevented.

A cutting unit 110 that cuts the web W transversely to the conveyance direction of the conveyed web W is disposed on the downstream side of the pre-cutter roller 120 in the conveyance direction of the web W. The cutting unit 110 has a cutter and cuts the continuous web W into sheets according to a cutting position set to a specific length. The cutting unit 110 may use a rotary cutter, for example. This enables cutting while conveying the web W. Productivity can therefore be improved because conveyance of the web W is not stopped for cutting. Note that the cutting unit 110 is not limited to a rotary cutter, and other types of cutters may be used.

A post-cutter roller 125 is disposed on the downstream side of the cutting unit 110 in the conveyance direction of the web W. The post-cutter roller 125 comprises a pair of rollers 126*a* and 126*b*. Of the rollers 126*a* and 126*b*, one is the drive roller and the other is a driven roller.

Tension can be applied to the web W in this embodiment of the invention by the speed difference between the pre-cutter roller 120 and the post-cutter roller 125. In this configuration, the cutting unit 110 is driven to cut the web W while tension is applied to the web W.

A pair of fuser rollers 151 embodying a fuser unit 150 are disposed on the downstream side of the post-cutter roller 125 in the conveyance direction of the web W. The fuser unit 150 bonds (fuses) the fibers contained in the web W through the resin. A heater or other type of heating member is disposed in the axial center of the fuser rollers 151, and heat and pressure can be applied to the conveyed web W by passing the web W between the pair of fuser rollers 151. By applying heat and pressure to the web W with the pair of fuser rollers 151, the resin melts and becomes more easily interlaced with the fibers, the distance between fibers becomes shorter, and the number of points of contact between the fibers increases. As a result, density increases and web W strength is improved.

A second cutting unit 130 that cuts the web W in the conveyance direction of the web W is disposed on the downstream side of the fuser unit 150 in the conveyance direction of the web W. The second cutting unit 130 has a cutter, and cuts at a specific cutting position in the conveyance direction of the web W. As a result, a sheet Pr (web W) of a desired size is formed. The cut sheet Pr (web W) is then stacked in a stacker 160, for example.

A sheet in this embodiment of the invention refers primarily to sheet products that are manufactured from feedstock containing recovered paper, virgin pulp paper, or other type of fiber. The feedstock is not so limited, however, and may be in the form of paperboard or web (or corrugated). The feedstock may also be cellulose or other type of plant fiber, synthetic fiber such as PET (polyethylene terephthalate) and polyester, or wool, silk, or other animal fiber. Sheets as referred to herein are separated into paper and nonwoven cloth. Paper includes thin sheets, recording paper for handwriting and printing, wall paper, packaging paper, color paper, and bristol paper, for example. Nonwoven cloth includes products that are thicker or have lower strength than paper, and includes nonwoven cloth, fiberboard, tissue paper, kitchen paper, cleaning paper, filter paper, liquid absorption materials, sound absorption materials, cushioning materials, and mats, for example.

Recovered paper as used in this embodiment of the invention mainly refers to paper that has been previously printed on, but any paper product that is used as feedstock is considered recovered paper whether or not the paper was actually used.

Figure 2:
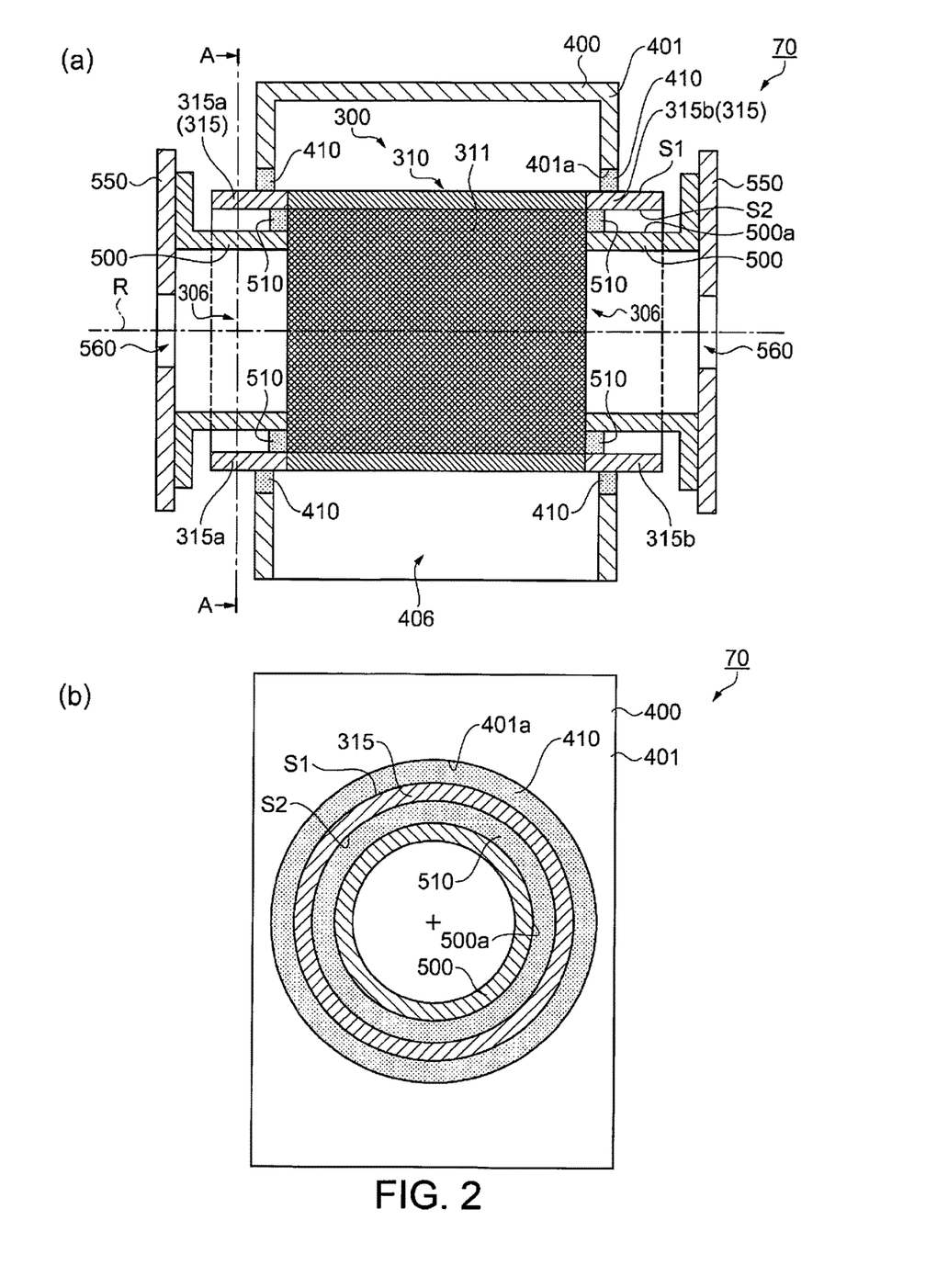
FIG. 2 schematically illustrates the configuration of the distributor unit.
Figure 3:
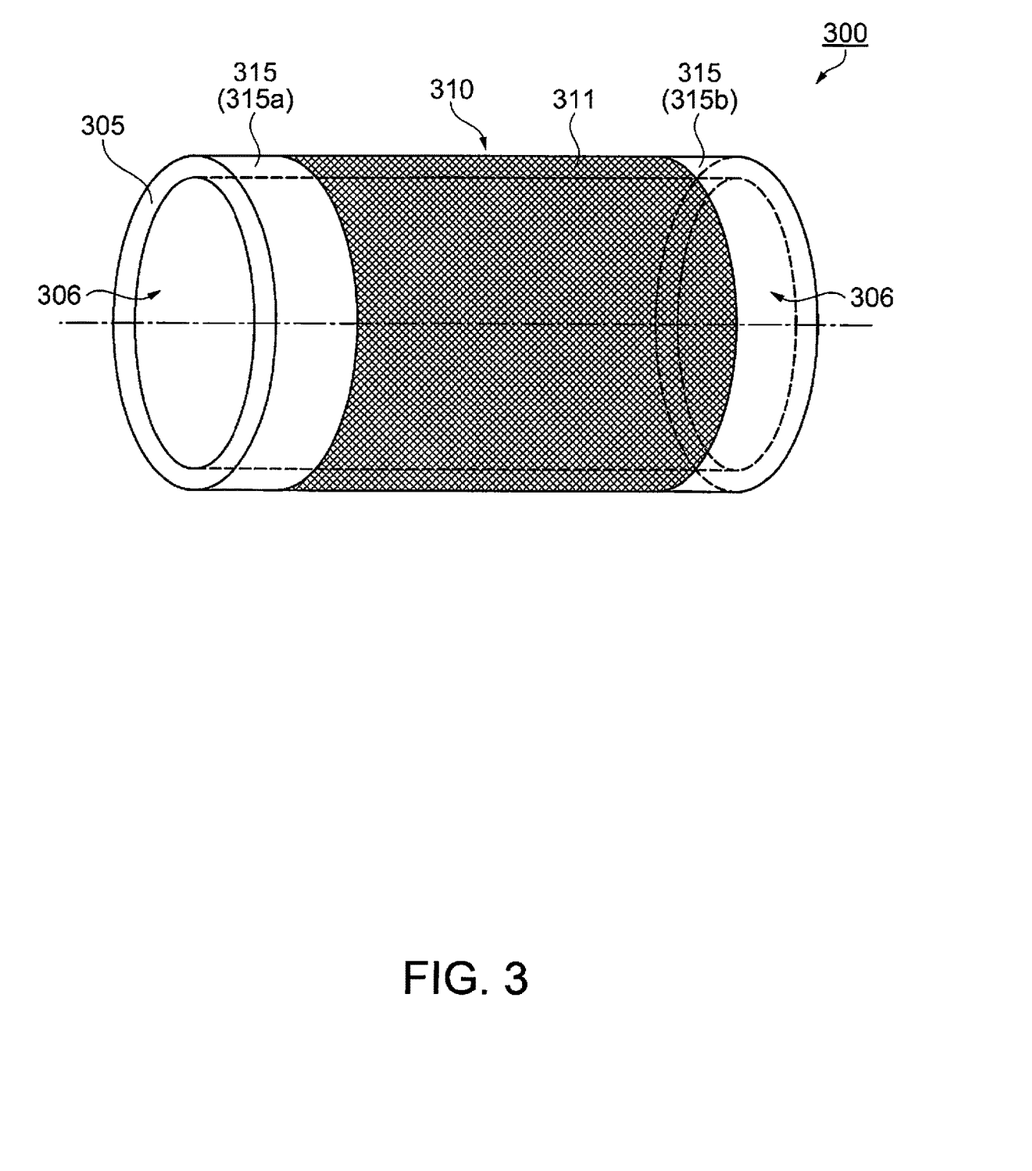
FIG. 3 is an oblique view showing the configuration of the drum unit.
Figure 4:
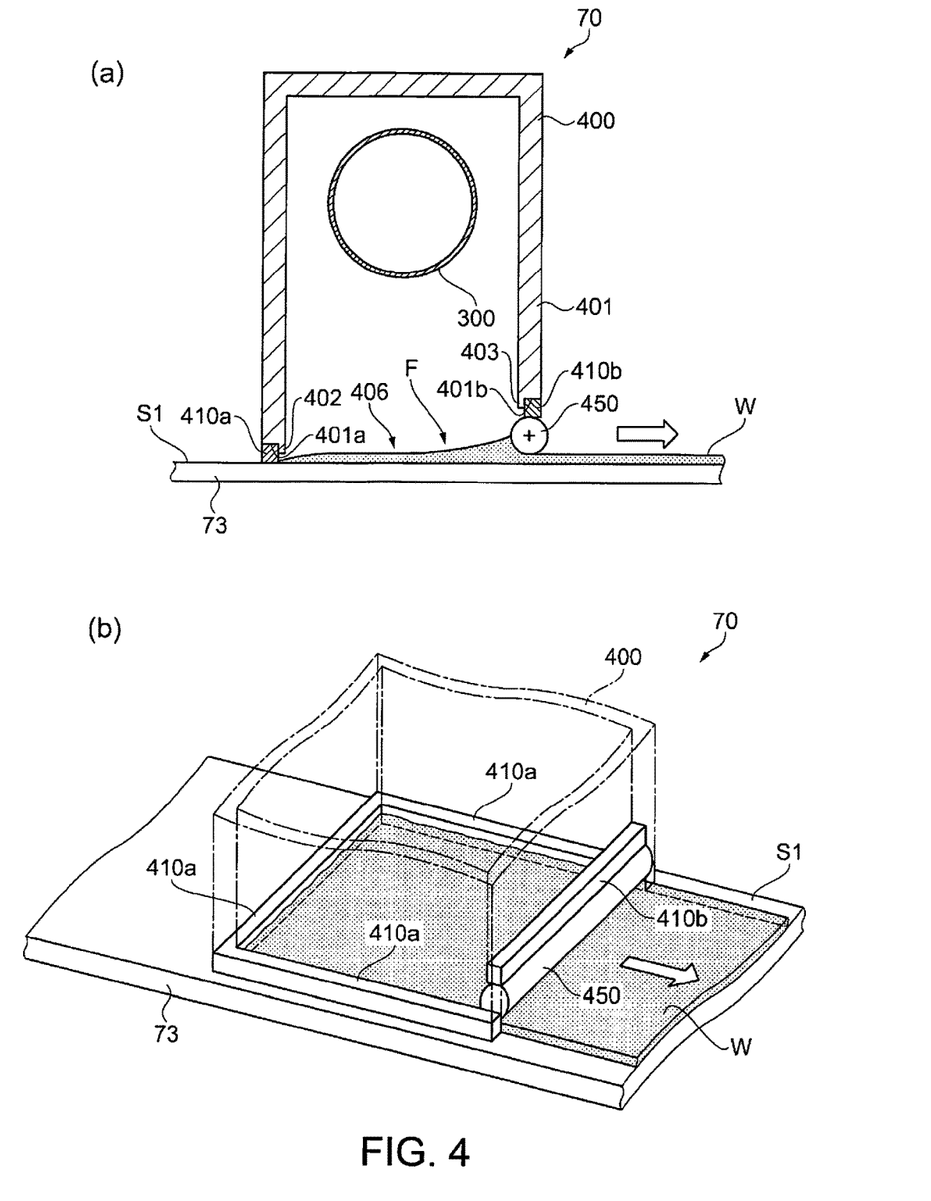
FIG. 4 schematically illustrates the configuration of the area around the housing unit of the distributor unit.

The configuration of the distributor unit 70 is described in detail next. FIG. 2 schematically illustrates the configuration of the distributor unit 70, FIG. 2(a) being a section view through the axis of rotation, and FIG. 2(b) being a section view through line A-A in FIG. 2(a). FIG. 3 is an oblique view showing the configuration of the drum unit. FIG. 4 schematically illustrates the configuration of the area around the housing of the distributor unit, FIG. 4(a) being a section view including the mesh belt in the distributor unit, and FIG. 4(b) being an oblique view of the lower part of the distributor unit and the mesh belt. As shown in FIG. 2, the distributor unit 70 includes the drum unit 300 and housing 400.

As shown in FIG. 3, the drum unit 300 has a screen 310 with numerous apertures 311 through which airborne material including at least fiber passes, and a cylinder section 315 without apertures 311, disposed to a cylinder 305 that rotates. The screen 310 and cylinder section 315 are welded together or fastened together with screws, and rotate in unison. The cylinder 305 is made by forming a stainless steel or other type of metal sheet material of uniform thickness into a cylinder, and an opening 306 is provided in both ends.

Numerous apertures 311 (punched metal) are disposed to the screen 310. The screen 310 is configured so that material containing dispersed fibers passes from the apertures 311, and the size and formation area of the apertures 311 are set appropriately according to the size and type of material. Note that the screen 310 is not limited to punched metal, and a metal screen may be used. The many apertures 311 are all the same size (area) and are formed at a uniform interval. As a result, material that passes through the apertures 311 accumulates with uniform thickness and density on the mesh belt 73. Interlocked fibers are also untangled as they pass through the apertures 311. The cylinder section 315 is a portion having no apertures 311, and is the part that contacts the housing 400.

As shown in FIGS. 2(a) and (b), the housing 400 has a frame 401 formed from five connected walls with a space inside. An opening 406 is disposed instead of a floor at the bottom of the housing 400. The housing 400 has a frame interface 401a formed as a round hole in two opposing walls, and a pile seal strip 410 described below is attached to each frame interface 401a. There are no openings in the housing 400 other than the opening 406 and the frame interfaces 401a. The housing 900 surrounds the drum unit 300 so that the screen 310 is on the inside. In other words, the screen 310 portion of the drum unit 300 is in the space inside the housing 400. The housing 400 and the cylinder section 315 are also in contact with each other. In this embodiment of the invention, as shown in FIG. 3, the drum unit 300 has a cylinder section 315a, the screen 310, and a cylinder section 315b disposed along the axis of rotation R; and the housing 400, as shown in FIG. 2, contacts the surface (cylindrical surface) S1 of the cylinder sections 315a, 315b on the opposite side as the axis of rotation R. Dispersion of material including fibers, for example, that passes through the apertures 311 from the inside of the housing 400 to the outside can be suppressed by this contact between the housing 400 and the cylinder sections 315a, 315b. Furthermore, because the housing 900 is disposed on the inside of the drum unit 300 on the axis of rotation R of the drum unit 300, a configuration in which the width of the housing 400 is less than the width of the drum unit 300 along the axis of rotation R of the drum unit 300 can be achieved, and the device configuration can be made smaller. Note that because the housing 400 is thus larger than the outside diameter of the drum unit 300 in the direction transverse to the axis of rotation R of the drum unit 300, the housing 400 is positioned inside the drum unit 300.

The housing 400 in this embodiment of the invention has a pile seal strip 410, and the pile seal strip 410 touches the surface S1 of the cylinder section 315. The pile seal strip 410 in this example has a base member and numerous fibers densely implanted on one side of the base. The pile seal strip has numerous fibers implanted so densely that fibers that pass through the apertures 311 in the drum unit 300 cannot pass through. The other side of the base of the pile seal strip 410 is attached the frame interface 401a of the housing 400, and the distal ends of the fibers of the pile seal strip 410 are configured to contact the surface S1 of the cylinder section 315. There are no apertures in the surface S1 where the pile seal strip 410 contacts the cylinder section 315. Surface S1 is preferably smooth at least where the pile seal strip 410 touches. This enables the gap between the frame 401 of the housing 400 and the cylinder section 315 of the drum unit 300 to be substantially closed by the pile seal strip 410. Material including fibers that passes through the apertures 311 in the drum unit 300 therefore stays inside the housing 400, and discharge of material to the outside of the housing 400 can be suppressed. Furthermore, when the drum unit 300 turns on the axis of rotation R, wear where the cylinder section 315 and pile seal strip 410 slide against each other can be suppressed, and the rotational load on the drum unit 300 can be reduced. Note also that the length of the fibers in the pile seal strip 410 is set longer than the size of the gap between the frame 401 of the housing 400 and the cylinder section 315 of the drum unit 300. This is to ensure the pile seal strip 410 reliably contacts the cylinder section 315. Note also that the pile seal strip 410 may be disposed to the cylinder section 315. However, the contact area between the pile seal strip 410 and the frame 401 decreases in this event if the drum unit 300 shifts relative to the housing 400 along the axis of rotation R. As a result, the pile seal strip 410 is preferably disposed to the housing 400 to contact the cylinder section, which is larger than the pile seal strip 410 in the direction along the axis of rotation R.

As shown in FIG. 2, this embodiment of the invention also has a stationary flange unit 500 inside the cylinder section 315 of the drum unit 300, and the cylinder section 315 and flange unit 500 are in contact through a second pile seal strip 510. In this embodiment of the invention, a flange unit 500 is inside the cylinder sections 315a, 315b of the drum unit 300. The flange unit 500 is fastened to a flange plate 550. The flange plate 550 is affixed to an external frame not shown. A material supply port 560 for supplying material containing fiber into the drum unit 300 is disposed to the flange plate 550.

More specifically, the second pile seal strip 510 is disposed between the inside surface S2 of the cylinder section 315 and the surface 500a of the flange unit 500. The second pile seal strip 510 in this example has a base member and numerous fibers densely implanted on one side of the base. The pile seal strip has numerous fibers implanted so densely that material containing fiber cannot pass through. In this embodiment of the invention, the other side of the base of the second pile seal strip 510 is attached to the surface 500a of the flange unit 500, and the distal ends of the fibers of the second pile seal strip 510 are configured to contact the inside surface S2 of the cylinder section 315. As a result, the gap between the flange unit 500 and the cylinder section 315 of the drum unit 300 is substantially closed by the second pile seal strip 510. Discharge of material including fibers of the drum unit 300 from the gap between the cylinder section 315 of the drum unit 300 and the flange unit 500 can therefore be suppressed. Furthermore, because the drum unit 300 turns on the axis of rotation R, wear can be suppressed by use on the sliding part where the cylinder section 315 and the second pile seal strip 510 rub, and the rotational load on the drum unit 300 can be reduced. Note also that the length of the fibers in the second pile seal strip 510 is set longer than the size of the gap between the flange unit 500 and the cylinder section 315 of the drum unit 300. This is to ensure the second pile seal strip 510 reliably contacts the cylinder section 315. Because the second pile seal strip 510 is attached to the flange unit 500, the flange unit 500 may also be said to have the second pile seal strip 510. Note that the second pile seal strip 510 may be attached to the cylinder section 315. The second pile seal strip 510 is also attached to the screen 310 end of the flange unit 500. The invention is not so limited, however, and the second pile seal strip 510 may be disposed to a position away from the screen 310. This configuration opens a gap between the flange unit 500 and the cylinder section 315, and the tribological load on the drum unit 300 may increase as a result of material containing fiber getting into this gap. The second pile seal strip 510 is therefore preferably attached at the screen 310 end of the flange unit 500 because an increase in the tribological load can be prevented. Note that the drum unit 300 is supported by a support unit not shown, and the weight of the drum unit 300 does not bear on the pile seal strip 410 or the second pile seal strip 510.

The housing 400 in this embodiment of the invention contacts the web W on the downstream side in the conveyance direction of the web W, and contacts the mesh belt 73 (part of the conveyance unit 100) at a position upstream in the conveyance direction of the web W from the part that contacts the web W on the downstream side. In this embodiment of the invention, as shown in FIG. 4(a), the housing 400 has a roller 450 that contacts the web W on the downstream side in the conveyance direction of the web W. The housing 400 also has a third pile seal strip 410a that contacts the mesh belt 73 (part of the conveyance unit 100) upstream in the conveyance direction of the web W from the downstream contact position, that is, the location of the roller 450.

The third pile seal strip 410a in this example has a base member and numerous fibers densely implanted on one side of the base. The pile seal strip has numerous fibers implanted so densely that fibers that pass through the drum unit 300 cannot pass through. As shown in FIG. 4 (b), the third pile seal strip 410a is disposed to positions other than where the roller 450 of the housing 400 is located. In this configuration, the other side of the base of the third pile seal strip 410a is attached to the frame interface 401a of the housing 400, and the distal ends of the fibers of the third pile seal strip 410a are configured to contact the surface S1 of the mesh belt 73. More specifically, a third pile seal strip 410a is disposed to the three sides of the housing 400 not including the side where the roller 450 is located. As a result, the gap between three sides of the housing 400 and the mesh belt 73 is substantially closed by the third pile seal strip 410a. So that these three sides of the housing 400 can contact the surface of the mesh belt 73, the width of the mesh belt 73 is greater than the width of the housing 400 in the direction transversely to the direction of travel of the mesh belt 73 (the conveyance direction of the web W). Because the mesh belt 73 moves relative to the distributor unit 70, wear between the mesh belt 73 and the third pile seal strip 410a is suppressed, and the load on the mesh belt 73 can be reduced. The length of the fibers in the third pile seal strip 410a is longer than the size of the gap between the frame interface 401a of the frame 401 of the housing 400 and the mesh belt 73. This is so that the third pile seal strip 410a reliably contacts the mesh belt 73. A first overhang 402 extends down from the housing 400 on the inside side of the third pile seal strip 410a. The bottom of the first overhang 402 extends to a point not touching the mesh belt 73 and covering at least half of the inside area of the third pile seal strip 410a. If fibers from the third pile seal strip 410a separate and get inside the housing 400, the fibers may catch and become interlocked with material containing fiber that past through the apertures 311, creating large lumps of fiber. If such fiber lumps become mixed into the web W, sheets may be formed with undesirably high density in spots. Separation of fibers from the third pile seal strip 410a can be prevented by covering the inside side of the third pile seal strip 410a with the first overhang 402 of the housing 400. Material containing fiber that past through the apertures 311 can also be prevented from clinging to the inside of the third pile seal strip 410a.

As shown in FIG. 4(b), the axis of rotation of the roller 450 of the housing 400 extends in a direction transversely (the width of the web W) to the conveyance direction of the web W. The length of the roller 450 is equal to the width of the frame 401 across the width of the web W at a position other than the three sides of the frame 401 where the third pile seal strip 410a is disposed.

A drive unit (not shown in the figure) such as a motor that drives the roller 450 is also disposed to the roller 450. By thus driving the roller 450, the web W can be more easily pulled in the conveyance direction and the web W can be reliably conveyed. The roller 450 can also move, and has an urging member (not shown in the figure) such as a spring member that urges the roller 450. In this embodiment of the invention the roller 450 can move vertically (the direction perpendicular to the web W accumulation surface), and an urging unit that urges the roller 450 to move vertically is provided. As a result, the position can change according to the thickness of the web W deposited on the mesh belt by the drum unit 300, and the web W can be conveyed without breaking up even when webs W of different thickness are conveyed.

The housing 400 has a fourth pile seal strip 410b on the downstream side in the conveyance direction of the web W, and the fourth pile seal strip 410b contacts the roller 450. The configuration of the fourth pile seal strip 410b is the same as the configuration of the third pile seal strip 410a, and further description thereof is omitted. The other side of the base of the fourth pile seal strip 410b is attached to the frame interface 401b of the housing 400, and the distal ends of the fibers of the fourth pile seal strip 410b are configured to contact the surface of the roller 450. As a result, the gap between the frame interface 401b of the housing 400 and the roller 450 is substantially closed by the fourth pile seal strip 410b. Because the roller 450 is driven rotationally, wear is suppressed by using the fourth pile seal strip 410b where the roller 450 and fourth pile seal strip 410b rub, and the load on the roller 450 can be reduced. The length of the fibers in the fourth pile seal strip 410b is set longer than the size of the gap between the frame interface 401b of the frame 401 of the housing 400 and the roller 450. This is so that the fourth pile seal strip 410b reliably contacts the roller 450. A second overhang 403 extends down from the housing 400 on the inside side of the fourth pile seal strip 410b. The bottom of the second overhang 403 extends to a point not touching the roller 450 and covering at least half of the inside area of the fourth pile seal strip 410b. The operation and effect of the second overhang 403 are the same as the operation and effect of the first overhang 402, and further description thereof is omitted.

As shown in FIG. 4(b), of the four sides of the frame 401 of the housing 400 opposite the surface S1 of the mesh belt 73, the gap between the housing 400 and the mesh belt 73 is substantially closed by the third pile seal strip 410a on three sides. On the remaining one side, the gap between the housing 400 and the mesh belt 73 is substantially closed by the fourth pile seal strip 410b and the roller 450. As a result, material containing fiber that passes through the apertures in the drum unit 300 stays inside the housing 400, and discharge of such material outside the housing 400 can be suppressed.

The operating method of the distributor unit 70 is described next. Material including the fibers separated by the cyclone 40 and fusion bonding resin introduced from the additive agent feed unit 601s supplied through the pipe 204 to the drum unit 300 from the material supply port 560 of the flange plate 550. There is no gap in the connection between the pipe 204 and the material supply port 560, and material will not leak from the connection. In this embodiment of the invention, the housing 400 is large enough to contact the cylinder section 315 of the drum unit 300, and there is no contact between the housing 400 and the pipe 204 located outside of the cylinder section 315. Material is supplied from the pipe 204 through the flange unit 500. The material supplied from the material supply port 560 then flows through the opening 306 in the drum unit 300 to the screen 310 side.

The drum unit 300 is driven rotationally on the axis of rotation R by a drive unit (such as a motor) not shown. As a result, the fibers and resin supplied into the drum unit 300 are mixed, and the material including fibers and resin is dispersed by centrifugal force. The dispersed material then passes through the apertures 311 in the screen 310. Material F that past through the apertures 311 then drops to the opening 406 in the bottom of the housing 400, and is deposited on the mesh belt 73.

When the drum unit 300 is driven rotationally when material is supplied into the drum unit 300 and the material is dispersed, some of the dispersed material is distributed to the boundary between the drum unit 300 and housing 400, and to the gap between the drum unit 300 and flange unit 500. As shown in FIG. 4, the pile seal strip 410 is therefore disposed at the joint between the drum unit 300 and housing 400 in this embodiment of the invention. Dispersion of material distributed toward the boundary between the drum unit 300 and housing 900 is therefore limited by the pile seal strip 410. In addition, a second pile seal strip 510 is disposed to the gap between the drum unit 300 and flange unit 500. Dispersion of material distributed toward the gap between the drum unit 300 and flange unit 500 is therefore limited by the second pile seal strip 510.

When material F dispersed by the drum unit 300 falls to the opening 406 and is deposited on the mesh belt 73, some of the dispersed material F is carried to the gap between the housing 400 and the mesh belt. As shown in FIG. 4, a roller 450 that contacts the web W, and a fourth pile seal strip 410b disposed between the roller 450 and the frame 401 of the housing 400, are disposed on the downstream side in the conveyance direction of the web W. A third pile seal strip 410a that contacts the surface S1 of the mesh belt 73 is also disposed upstream from the roller 450 in the conveyance direction of the web W. As a result, dispersal of material F carried toward the gap between the housing 400 and mesh belt 73 is limited by the third pile seal strip 410a and roller 450.

A closed space is thus formed inside the housing 400 by the roller 450 that contacts the web W and the third pile seal strip 410a that contacts the mesh belt 73. While material F that passes through the openings by rotationally driving the drum unit 300 falls toward the opening 406 at the bottom side of the housing 400, the material F including fibers dispersed in air is pulled down by driving the suction device 75 (FIG. 1) disposed on the opposite side of the mesh belt 73. Because material F is deposited on the mesh belt 73 while being suctioned in the closed space of the housing 400, the material F (web W) can be evenly deposited.

Effects of the foregoing embodiment are described below.

The housing 400 covering the drum unit 300 has a roller 450 that contacts the deposited web W on the downstream side in the conveyance direction of the web W, and has a pile seal strip 410a that contacts the mesh belt 73 upstream from the roller 450 in the conveyance direction of the web. Therefore, material F that past the drum unit 300 stays in the housing 400, and material F flowing to the outside of the housing 900 can be suppressed. Note that if this embodiment of the invention is used in a wet process using a large amount of water, a tight seal cannot be made with a pile seal strip and water will therefore leak out. However, this embodiment of the invention is a dry system that deposits airborne material that past the drum unit as a web. As a result, leakage of air is not a problem. To prevent material containing fiber from getting outside, it is sufficient for the housing 400 to be in contact with the mesh belt 73, or for the housing 400 to be in contact with the web W. In a wet system, a rubber or other type of flexible seal member is required. This creates such problems as increasing the tribological load of the mesh belt 73, and increasing wear. Compared with using a rubber seal, using a pile seal reduces the tribological load and wear. When materials wear, gaps may form and material containing fiber leak, the worn material may become mixed with the material containing fiber, and the quality of the manufactured sheet drops.

The present invention is not limited to the foregoing embodiment, and the foregoing embodiment can be modified and improved in many ways. Some examples are described below.

EXAMPLE 1

A pile seal strip 410b is disposed to the roller 450 in the foregoing embodiment but may be omitted. In this case, the gap between the housing 400 and roller 450 must be narrow enough to prevent material from getting outside. Because the direction of rotation of the roller 450 inside the housing is the direction of rotation to the inside of the housing, material F deposited on the roller 450 will not be discharged to the outside by the direction of rotation.

EXAMPLE 2

The housing 400 in the foregoing embodiment is rectangular, but the frame 401 may be curved or sloped.

EXAMPLE 3

The housing 400 in the foregoing embodiment contacts the cylinder section 315 of the drum unit 300. However, the housing 900 may be larger than the drum unit 300 in the direction of the axis of rotation of the drum unit 300.

EXAMPLE 4

The drum unit described in the foregoing embodiment may function to separate material that passes the apertures 311 from material that does not pass, may function to detangle material by the material passing through the apertures 311, and may function to disperse material by the material passing through the apertures 311. Or it may have at least one of these functions.

EXAMPLE 5

Note that the first overhang 402 and second overhang 403 may be members that are separate from the housing 400 and are affixed to the housing 400 or affixed to the inside of the third pile seal strip 410a.

EXAMPLE 6

Terms such as "same," "uniform," "uniform interval," and "round" in the foregoing embodiment include deviations and cumulative error, and are not limited to meaning exactly the same, uniform, uniform interval, or round.

EXAMPLE 7

In the foregoing embodiment, the width of the mesh belt 73 is greater than the width of the housing 400 in the direction transversely to the direction of travel of the mesh belt 73 (the conveyance direction of the web W), but the invention is not so limited. For example, the housing 400 may be larger than the mesh belt 73 and have a pile seal strip 410a disposed to contact the side of the mesh belt 73. In other words, the housing 400 may contact the mesh belt 73 at a part other than surface S1 (the surface on which the web W is deposited).

REFERENCE SIGNS LIST

1 sheet manufacturing apparatus
10 supply unit
20 shredder
30 defibrating unit
40 classifier
50 receiver
60 additive agent feed unit
70 distributor unit
73 mesh belt
75 suction device
100 conveyance unit
110 cutting unit
120 pre-cutter roller
125 post-cutter roller
130 second cutting unit
140 pressing unit
150 fuser unit
160 stacker
200 forming unit
300 drum unit
400 housing
401 frame
402 first overhang
403 second overhang
406 opening
410, 410a, 410b, 510 pile seal strip
450 roller
F material
W web
Pr sheet

The invention claimed is:

1. A sheet manufacturing apparatus comprising:
   a drum unit in which material including at least fiber passes through apertures;
   a conveyance unit on which airborne material that has passed through the drum unit is deposited as a web, the conveyance unit conveying the web;
   a housing unit covering the drum unit, the housing unit having
      a roller that contacts the web on the downstream side in a conveyance direction of the web, and
      a first pile seal disposed at a position other than where the roller is located, such that the first pile seal contacts the conveyance unit; and
   a forming unit that forms a sheet using the web that has been conveyed by the conveyance unit.

2. The sheet manufacturing apparatus described in claim 1, further comprising:
   an urging member that urges the roller,
   the roller is movable by urging of the urging member.

3. The sheet manufacturing apparatus described in claim 1, wherein:
   the housing unit further has a second pile seal that is disposed on the downstream side in the conveyance direction of the web and contacts the roller.

4. The sheet manufacturing apparatus described in claim 1, wherein:
   the first pile seal is disposed on the upstream side in the conveyance direction of the web.

5. The sheet manufacturing apparatus described in claim 1, wherein:
   a dimension of the conveyance unit in a perpendicular direction perpendicular to the conveyance direction of the web is greater than a dimension of the housing unit in the perpendicular direction.

6. The sheet manufacturing apparatus described in claim 1, wherein:

the first pile seal is disposed at both side portions of the housing unit in an intersecting direction that intersects with the conveyance direction of the web.

\* \* \* \* \*